US006112779A

United States Patent [19]
Camilla

[11] Patent Number: 6,112,779
[45] Date of Patent: Sep. 5, 2000

[54] BOTTLE STOPPER HAVING A DEVICE FOR DRAWING UP METERED AMOUNTS OF THE LIQUID CONTAINED IN SAID BOTTLE

[75] Inventor: Maffei Camilla, Pistoia, Italy

[73] Assignee: Project s.a.s.di Massimo Menichelli & C., Italy

[21] Appl. No.: 09/423,099

[22] PCT Filed: Apr. 28, 1998

[86] PCT No.: PCT/IT98/00108

§ 371 Date: Nov. 1, 1999

§ 102(e) Date: Nov. 1, 1999

[87] PCT Pub. No.: WO98/50157

PCT Pub. Date: Nov. 12, 1998

[30] Foreign Application Priority Data

May 2, 1997 [IT] Italy .................................. FI97A0101

[51] Int. Cl.[7] ................................ B65B 1/04; B65B 3/04; B65B 31/00; B67C 3/00
[52] U.S. Cl. ................................ 141/23; 141/22; 141/25; 141/27; 141/94; 141/380; 141/381; 222/47; 222/49; 222/205; 222/309; 215/217; 215/219; 215/221
[58] Field of Search .................................. 141/22, 23, 25, 141/27, 94, 380, 381; 222/41, 47–49, 205, 309; 215/217–221, 901

[56] References Cited

U.S. PATENT DOCUMENTS

| 3,881,624 | 5/1975 | Dougherty, Sr. ......................... 215/221 |
| 5,671,853 | 9/1997 | Herr . |
| 5,746,349 | 5/1998 | Putteman et al. ........................ 222/49 |
| 5,836,359 | 11/1998 | Seidler ..................................... 141/23 |

FOREIGN PATENT DOCUMENTS

| 0 723 921 A2 | 7/1996 | European Pat. Off. . |
| 882 755 | 7/1953 | Germany . |
| 1 154 232 | 9/1963 | Germany . |
| 85 29 592 | 7/1986 | Germany . |
| 814161 | 5/1959 | United Kingdom . |
| 2301 817 | 12/1996 | United Kingdom . |
| WO 96/17787 | 6/1996 | WIPO . |

*Primary Examiner*—Henry J. Recla
*Assistant Examiner*—Timothy L. Maust
*Attorney, Agent, or Firm*—McGlew and Tuttle, P.C.

[57] ABSTRACT

The capsule (11), which can be screwed onto the threaded neck (3) of the bottle, coaxially forms the cylinder (15) of the syringe device; an element (21) inside the capsule (11) and surrounding the cylinder (15) forms an annular leaktight seal (21A) which can be tightened onto the edge (3B) of the neck (3) and fits inside the bottle neck by means of a shaped extension piece (21B); said element (21) accommodates, via a central hole, the cylinder (15) of the syringe device and surrounds it with an annular lip (21C) which extends toward the center of the bottle so as to wipe the outer surface of the cylinder as the capsule is fitted with a safety cap (29) and a seal (33).

8 Claims, 4 Drawing Sheets

BOTTLE STOPPER HAVING A DEVICE FOR DRAWING UP METERED AMOUNTS OF THE LIQUID CONTAINED IN SAID BOTTLE

SUMMARY OF THE INVENTION

The invention relates to an improved stopper for the screw-closure of bottles containing liquids, having a syringe device for drawing up metered amounts of said product. These stoppers comprise a capsule with an internal thread which is screwed onto the threaded neck of the bottle, and a syringe device with a cylinder, a plunger and—so as to move the plunger—a graduated plunger rod which measures the suction stroke of the plunger and therefore the amount of liquid sucked up.

The way in which the stopper in question is made means that it can be used in automatic bottle filling and sealing plant, it prevents pressure differences from forming between the outside and the inside of the bottle, it offers peace of mind in that it cannot be opened by a child and it offers a tamper-proof seal. These and other objects and advantages will become clear in the following text.

According to the invention: the cylinder of the syringe device is formed coaxially and as one piece with the capsule; an element inside the capsule and surrounding said cylinder forms a) an annular leaktight seal which can be tightened onto the edge of the bottle neck by screwing down the capsule, b) an extension piece having an annular cross section and external shaping so that it can fit securely inside the bottle neck and c) a central hole for accommodating the cylinder of the syringe device; said hole is surrounded by an annular lip which extends toward the center of the bottle and is designed to wipe the outer surface of the cylinder as the capsule with the syringe device is pulled out. A ring with cuts made in its circumference is attached in order to form a tamper-proof seal against unauthorized opening.

In order to avoid any pressure differences between the outside and the inside of the bottle, said internal element can have at least one hole between said extension piece and said lip, so that the pressure inside and outside the bottle can balance out.

A safety cap with a deformable side wall is fitted and engaged on said capsule so that it can rotate freely; the inner surface of said safety cap and the outer surface of said capsule will in this case be shaped such that flexible fins provide a spontaneous rotational coupling in the screwing direction and teeth—which, in the cap, are located in deformable zones of the side wall—provide coupling in the unscrewing direction, but only when there is deformation of the side wall.

A better understanding of the invention will be gained by following the description and the accompanying drawing which shows a practical and non-limiting example of said invention. In the drawing:

DETAILED DESCRIPTION OF THE PREFERRED EMBODIMENT

Figure 1:
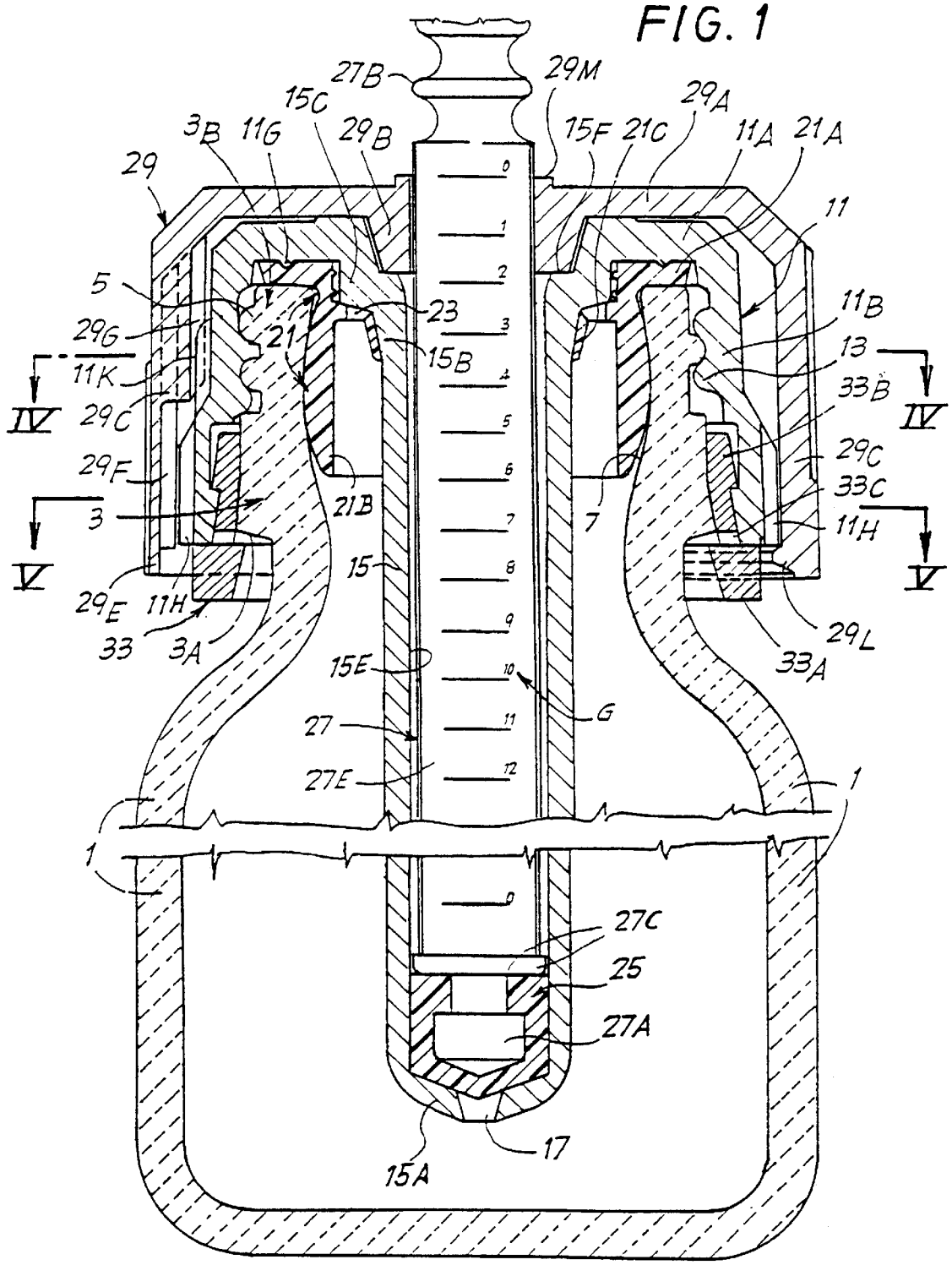
FIG. 1 shows a view in axial section of a bottle, with part removed, and of the stopper in the closed position.

According to the illustrations of the accompanying drawing, the reference numeral 1 denotes a bottle, the neck 3 of which has an external thread 5 and a shallow internal hollow 7 caused by shrinkage during the molding of the glass or plastic from which the bottle is made, or by some other suitable and known method. The reference 3A denotes an annular projection located near the bottom end of the neck 3 and the reference 3B denotes the top edge of the neck 3 which surrounds the bottle opening and ensures that the stopper provides hermetic sealing.

11 is the general reference for the main body of the stopper which is in the form of a capsule with a top 11A and a side wall 11B, formed on the inside of which is an internal thread 13 designed to engage with the thread 5 in order to screw the stopper closed. Formed in one piece with the capsule 11 is a cylinder 15 which extends away from the center of the top 11A and—when the capsule 11 is attached—penetrates through the neck 3 and into the body 1 of the bottle, terminating near the bottom of the bottle in a shaped portion 15A with a hole 17 at its center. The cylinder 15 connects up with the top 11A via a first frustoconical portion 15B and a subsequent step 15C. The cavity 15E in the cylinder 15 connects up with the outer surface of the top 11A via a shaped portion defining a step 15F. The internal surface of the top 11A of the capsule 11 forms an annular ridge 11G which is designed to ensure hermetic sealing in the manner detailed below, said annular ridge 11G being in a position essentially corresponding to the terminal edge 3B of the neck 3 of the bottle.

Figure 2:
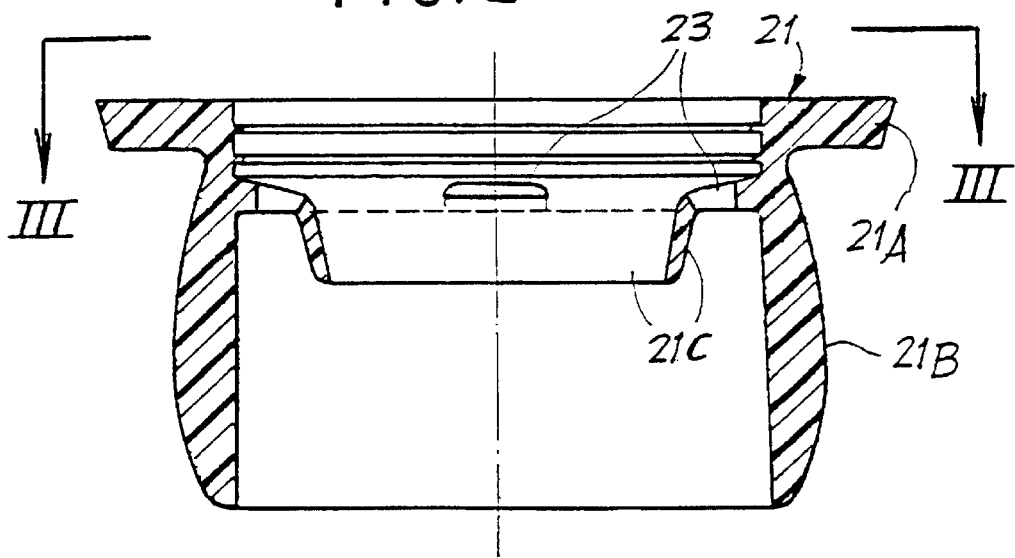
FIGS. 2 and 3 show, in isolation, an internal element forming the leaktight seal, in cross section and viewed on the line III—III in FIG. 2, respectively.
Figure 3:
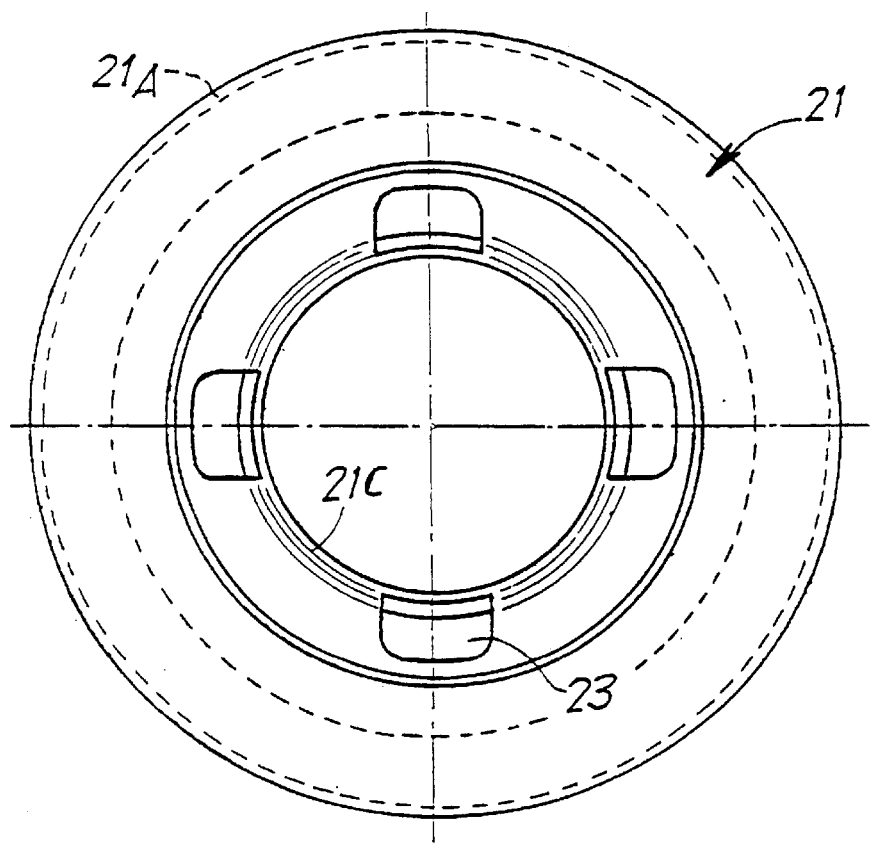

21 is the general reference (see also FIGS. 2 and 3) for an element inside the capsule which is shaped such that it forms an annular leaktight seal 21A designed to engage with the edge 3B and with the ridge 11G when the element 21 is placed against the top 11A of the capsule 11 and the latter is screwed onto the neck 3. The element 21 forms an annular extension piece 21B which extends away from the annular leaktight seal 21A and penetrates through the neck 3 opening of the bottle 1, engaging inside said opening; to this end, said annular extension piece 21B can have a slightly convex and bulging outer surface which engages with the profile 7 of the inner surface of the neck 3 of the bottle; as an alternative, or in addition, to the abovementioned shaped portions interference may be provided between the neck 3 opening and said extension piece 21B. Extending inward from the extension piece 21B is an annular lip 21C which extends toward the center of the bottle when the stopper is attached; this lip 21C presses against the frustoconical profile 15B of the cylinder 15 so as to engage with it and with the outer surface of said cylinder 15, for the purposes detailed below. The lip 21C of the element 21 contains at least one hole 23 or several holes 23 spaced out around the annular lip 21C, for the purposes detailed below.

Figure 7:
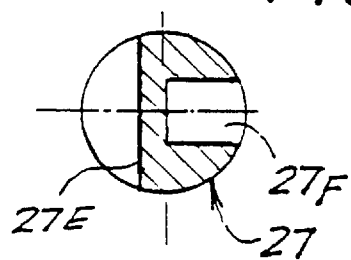
FIGS. 6 and 7 show a detail of the plunger rod, in longitudinal section and in cross section on VII—VII in FIG. 6.
Figure 6:
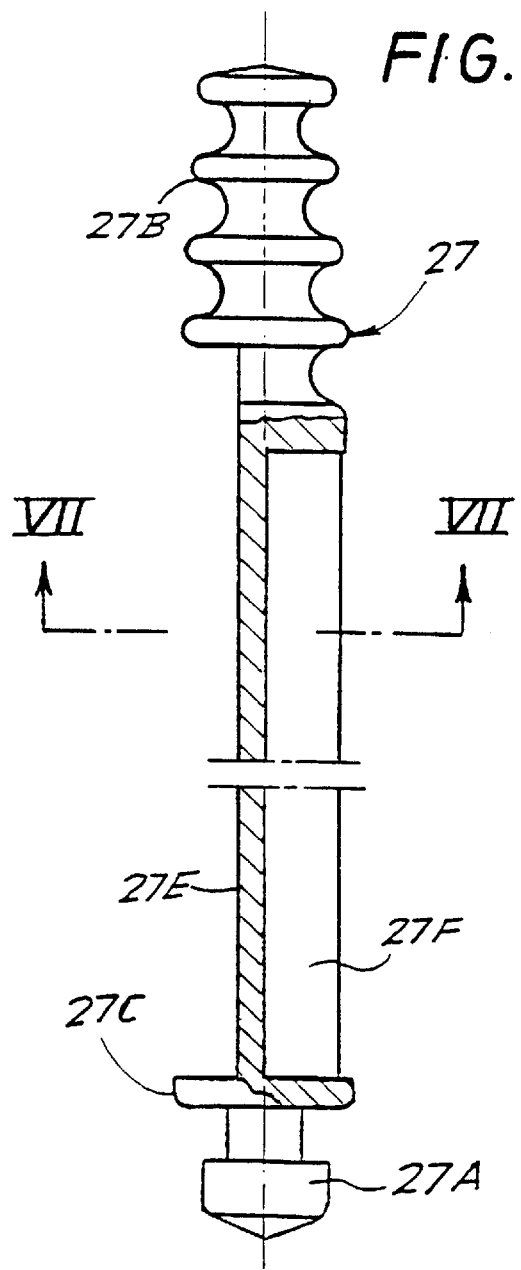

Inserted so that it can slide inside the cylinder 15 is a plunger which runs along the inner surface 15E of the cylinder 15; this plunger consists of a component 25 which is made from a material with a low friction coefficient and sufficient elasticity to ensure leaktightness against the inner surface 15E of the cylinder while at the same time sliding easily against it; this component 25 forming the plunger is attached to the internal end 27A of a plunger rod 27 which extends such that its top end 27B is outside the capsule 11 and has a shape such that it can be easily gripped with the fingers in order to slide the plunger 25 up and down the cylindrical surface 15E under hermetically sealed conditions. The rod 27 has (see FIGS. 6 and 7) a flat side 27E for a graduated scale G and a groove 27F to lighten the structure. When the stopper is attached, the hole 17 in the cylinder 15 is essentially very close to the bottom of the bottle so that, by moving the syringe unit—consisting of the cylinder 15 and the plunger 25 with its rod 27—it is possible to suck up virtually all the liquid contained in the bottle.

Figure 4:
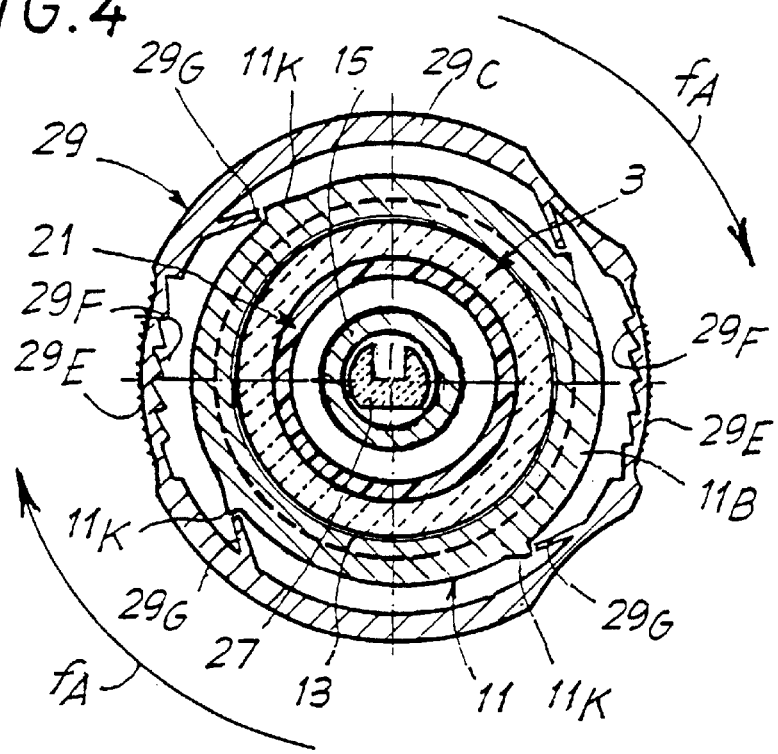
FIGS. 4 and 5 show two cross sections on IV—IV and V—V of FIG. 1, in the shaped zones for screwing and unscrewing the capsule.
Figure 5:
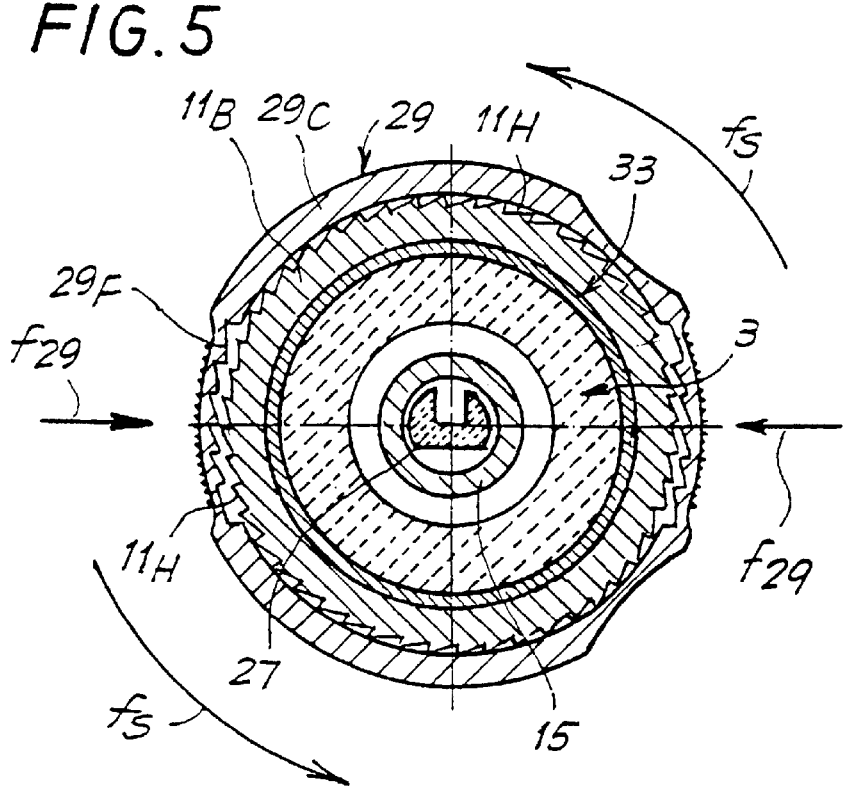

So that it cannot be opened accidentally by a child, the stopper described above is fitted with a safety device, i.e. with a so-called "child-proof" device, comprising a safety cap 29 which can be fitted over the capsule 11 of the stopper and has a top 29A which rests against the outside of the top 11A of the capsule 11, a central conical extension piece 29B which extends to the step 15F and a hole through which the rod 27 passes. Once the rod 27 is housed inside the cylinder 15, the central conical extension piece 29B forms an abutment surface for said rod 27, limiting its stroke at the point where said extension piece 29B comes into contact with an annular abutment surface 27C formed on the rod 27, next to the plunger 25. The safety cap 29 has some flexible zones 29E in its cylindrical side surface 29C which can be deformed inward in the direction of the centripetal radial arrows f29 (FIG. 5); the flexible zones 29E in the wall 29C have ridges 29F which—when pressed in the direction f29—mesh with ridges 11H in a ring of ridges formed on the outer surface of the cylindrical wall 11B of the capsule 11. Only by compressing the deformable zones 29E in the wall 29C and thus forming a grip between the ridges 29F and 11H, is it possible to rotate the unit 29 and 11 in the direction of the arrows f5 in order to open the bottle by unscrewing the capsule 11 from the thread 5 of said bottle; it is virtually impossible for a child to do this. Slanted tongue-like portions 29G on the safety cap 29 and sawteeth 11K (FIGS. 1 and 4) on the capsule 11 make it possible to effect only angular movements—when the safety cap 29 and the capsule 11 are in the coupled state—solely in the direction of the arrows fA, allowing the capsule to be screwed onto the thread 5 of the bottle neck 3 but preventing an unscrewing action, during which the tongues 29G simply bend and do not engage with the teeth 11K. It is thus possible to screw the capsule onto the bottle neck—and therefore close the bottle—under any conditions, whereas opening the bottle—i.e. unscrewing the capsule 11—is possible only when pressure is exerted in the direction fS specifically on the deformable zones 29E in the wall 29C of the safety cap 29, so allowing said cap and the capsule 11 to be engaged in rotation. Suitable discontinuous ridges 29L (FIG. 1), which extend out from the base of the cylindrical wall 29C of the safety cap 29 and which are interrupted at least in the area of the deformable zones 29E, prevent the safety cap 29 from being pulled axially off the capsule 11.

The reference 33 denotes an annular tamper-proof seal which consists of two rings 33A and 33B connected together by a circle of small breakable teeth 33C; the seal engages in a shaped portion inside the base of the wall 11B of the capsule 11 and the ring 33A can bear against the annular projection 3A on the neck 3. The tamper-proof seal is axially force-fitted onto the bottle. When the capsule 11 is unscrewed for the first time, the teeth 33C in the seal are broken.

The stopper as described—fitted with the safety cap 29 and the seal 33—can be handled as a single unit (which comprises the component 11, 15 as a single body, the component 21 and the plunger 25 with the rod 27, the safety cap 29 and the seal 33) so that it can be attached automatically, being fed to conventional bottle filling and sealing plant like stoppers of the conventional type. When the capsule 11 is attached, it is tightened against the edge 3B with the annular leaktight seal 21A in between, thereby ensuring that the bottle is hermetically sealed and its contents are preserved; this sealing action is further enhanced by the presence of an optional ridge 11G inside the top 11A of the capsule. The seal 33 is also fitted in its position of use at the time the capsule 11 is attached.

With the stopper attached (or only slightly unscrewed), it is possible to move the rod 27 of the plunger 25 so as to suck up a metered amount of liquid via the hole 17, up to a total amount which can be adjusted and controlled at will by means of the graduated scale G provided on the rod 27 of the plunger and which is easily read off by, for example, a marker which can consist of the edge 29M surrounding the rod (or of a corresponding edge formed by the top 11A of the capsule around the surface 15E of the cylinder 15). Once the desired amount of liquid has been sucked up, the stopper is removed from the bottle while the internal element 21 is retained on said bottle, being held in place by the engagement between the shaped portion 7 inside the neck 3 and the shaped extension piece 21B of the internal element 21. Removing the cylinder 15 with the capsule 11 and the cap 29 causes the lip 21C to slide over the outer surface of the cylinder 15, thereby wiping off the liquid, even a relatively thick liquid, contained in the bottle; there is therefore no liquid clinging to the outer surface of the cylinder 15 once the latter has been removed; the liquid that has been wiped off by the lip 21C falls back into the bottle before the stopper and its cylinder and plunger system are taken out of the bottle. It is then possible to dispense the metered amount sucked up into the cylinder by moving the plunger 25 in the opposite direction to the suction direction.

The presence of the holes 23 in the internal element 21 makes it possible to eliminate any pressure differences that may form between the outside and the inside of the bottle as soon as the user starts to unscrew the capsule 11 because, as soon as unscrewing has begun, the hermetic sealing action of the annular leaktight seal 21A against the top 11A of the capsule 11 ceases and a perfect balance is established, via the holes 23, between the internal and external pressures before unscrewing is complete and the stopper is fully removed from the bottle. The same thing happens when the stopper is reinserted: as the rod 27A of the syringe is pushed in, air escapes via the hole or holes 23, thereby maintaining the pressure balance. This feature is very important during the assembly stage, given the speed with which the stopper is inserted into the bottle. The possible danger of the liquid spurting out, which sometimes happens with devices of this type, is therefore avoided and it is also a means of ensuring that the whole unit functions correctly as regards the accuracy with which the liquid drawn up is measured, without this accuracy being adversely affected by such pressure differences. Once the capsule 11 (which forms the stopper) is screwed down, even if the bottle 1 is laid horizontally, the liquid contained in the bottle cannot pass through the holes 23 because the cone 15B and the surface 15C close off the holes 23 by acting on the leaktight seal 21.

The stopper in question offers particular advantages which should be clear from the preceding text. More specifically, it includes a safety cap 29 or so-called "child-proof" cap which (in order to work) is engaged on a single capsule/stopper/cylinder part 11, 15 which—in conjunction with the leaktight seal 21—allows full and proper functioning of the device, resulting in: (I) an excellent stopper with child-proof safety closure and leaktight seal (acting both as a sealing member and as a means of cleaning the cylinder); (II) an accurate instrument for measuring, from the outside, metered amounts which are drawn up; (III) a convenient means for dispensing said metered amounts.

Furthermore, from an industrial point of view, it is worth noting that: the whole unit is made up of only five parts (outer stopper 22, capsule/cylinder 11, 15, graduated rod 27, plunger 25 and leaktight seal 21), all of which can be molded from plastic with rapid manufacturing times; all the parts have been designed so that they can be assembled easily and by machine; once the unit has been assembled, it can be mounted onto the bottle in a single operation; said unit completely replaces stoppers currently on the market, offering improved performance; if each part is made from the same material—which is possible—the whole unit becomes fully recyclable.

From the point of view of production, the stopper unit described can therefore be used in existing automated plant without having to carry out virtually any modifications to the latter, therefore making it easily possible to replace the various types of stoppers required for individual production runs on the same plant.

It should be understood that the drawing shows only one example, given solely as a practical demonstration of the invention, and that the forms and arrangements of the latter may vary without thereby departing from the underlying concept of said invention. The presence of any reference numerals in the appended claims has the purpose of facilitating the reading of the claims with reference to the description and the drawing and does not limit the scope of protection represented by the claims.

What is claimed is:

1. A stopper for a screw-closure of bottle containing liquid having a device for drawing up metered amounts of the liquid, comprising a capsule-type stopper (11) with an internal thread which is adapted to be screwed onto the threaded neck of the bottle, and a syringe device with a cylinder, a plunger and—so as to move the plunger—a graduated plunger rod which measures the suction stroke of the plunger and therefore the amount of liquid sucked up, characterized in that it comprises:

a single part forming the capsule (11) and, coaxially, the cylinder (15), of the syringe device;

an element (21) inside the capsule (11) and surrounding the cylinder (15) which forms an annular leaktight seal (21A) which is adapted to be tightened onto the edge (3B) of the bottle neck (3) by screwing down the capsule (11), an extension piece (21B) having an annular cross section and external shaping adapted to fit securely inside the bottle neck (3), a central hole for accommodating the cylinder (15) of the syringe device, and an annular lip (21C) surrounding said hole and extending toward the center of the bottle so as to wipe the outer surface of the cylinder (15) as the capsule (11) and the syringe device are pulled out of the neck of the bottle;

a safety cap (29) with a radially deformable side wall (29C, 29E), fitted on said capsule (11) so as to engage therewith by means of sets of teeth (29G, 11K; 29F, 11H respectively) in order respectively to screw and unscrew said capsule; and an annular tamper-proof seal (33), fitted in said capsule (11) and adapted to engage with a ridge (3A) on the bottle neck (3).

2. Stopper according to claim 1, characterized in that said internal element (21) has at least one hole (23) between said extension piece (21B) and said lip (21C) in order to avoid any pressure differences between the outside and the inside of the bottle.

3. Stopper according to claim 1, characterized in that said safety cap (29), which is fitted on said capsule (11) so that it can rotate freely, has ridges (29L) along the bottom edge of its side wall (29C) which are designed to engage on the bottom edge of the side wall (11B) of said capsule (11).

4. Stopper according to claim 3, characterized in that said side wall (29C) of the safety cap has zones (29E) of reduced thickness with internal teeth (29F) designed to mesh with teeth (11H) on the outer surface of the capsule (11) when said zones (29E) of reduced thickness are deformed, in order to unscrew the capsule.

5. Stopper according to claim 4, characterized in that said side wall (29C) of the safety cap (29) has teeth and slanted flexible fins (29G) which are designed to mesh with slanted teeth (11K) on the capsule (11) in order to screw down the capsule.

6. Stopper according to claim 1, characterized in that said annular tamper-proof seal (33) has two rings (33A, 33B) connected together by small breakable teeth (33C); one of the rings (33B) engaging on the capsule (11), and the other (33A) being able to bear against a projection (3A) on the neck (3) of the bottle as the capsule (11) is opened.

7. Stopper according to claim 1, characterized in that the safety cap (29) comprises an extension piece (29B) which forms an abutment surface which abuts against an annular ridge (27C) formed on the rod (27) of the plunger.

8. Stopper according to claim 2, characterized in that the capsule (11) has an extension piece (15C) which is designed to close off the hole or holes (23) when the capsule is in the closed position.

* * * * *

UNITED STATES PATENT AND TRADEMARK OFFICE
CERTIFICATE OF CORRECTION

PATENT NO. : 6,112,779
DATED : September 5, 2000
INVENTOR(S) : Maffei

It is certified that error appears in the above-identified patent and that said Letters Patent is hereby corrected as shown below:

<u>Title page,</u>
Should read as follows:
[75]   Inventor:   Camilla Maffei, Pistoia, Italy Signed and Sealed this Sixth Day of November, 2001

Attest:

*Nicholas P. Godici*

NICHOLAS P. GODICI
*Attesting Officer         Acting Director of the United States Patent and Trademark Office*